United States Patent [19]

Jorgensen

[11] 4,309,802
[45] Jan. 12, 1982

[54] RING GEAR BURNISHING MACHINE

[75] Inventor: Arne R. Jorgensen, Lombard, Ill.

[73] Assignee: Illinois Tool Works Inc., Chicago, Ill.

[21] Appl. No.: 169,252

[22] Filed: Jul. 16, 1980

[51] Int. Cl.³ .............................................. B24B 39/00
[52] U.S. Cl. .................................................... 29/90 B
[58] Field of Search ................ 29/90 R, 90 B; 51/26; 72/110

[56] References Cited

U.S. PATENT DOCUMENTS

| | | | |
|---|---|---|---|
| 1,660,811 | 2/1928 | Perkins | 29/90 B X |
| 1,989,652 | 1/1935 | Drummond | 29/90 B |
| 2,188,629 | 1/1940 | Giesey | 29/90 R |
| 2,257,195 | 9/1941 | Rovick | 51/26 |
| 3,353,392 | 11/1967 | Anthony | 72/110 |
| 4,080,699 | 3/1978 | Anderson | 29/90 B |
| 4,157,637 | 6/1979 | Orlov et al. | 29/90 B X |
| 4,189,279 | 2/1980 | Anderson | 29/90 B |
| 4,206,535 | 6/1980 | Roth | 29/90 B |

FOREIGN PATENT DOCUMENTS

149946  6/1937  Austria ................................ 29/90 B

*Primary Examiner*—Harrison L. Hinson
*Attorney, Agent, or Firm*—Thomas W. Buckman; Glenn W. Bowen

[57] ABSTRACT

A ring gear burnishing machine is disclosed that has a pair of burnishing stations in which ring gear workpieces are burnished in an overlapping cycle that minimizes burnishing time. Each burnishing station consists of a support table which is coupled to an air cylinder spring and is vertically displaceable so that a burnishing gear is placed on the support table when it is in its lowered position, and burnishing takes place when the support table is in its raised position. Burnishing is accomplished by a pair of burnishing gears at each station. One of the burnishing gears of each pair is driven and the other burnishing gear of the pair is an idler gear. A gear engagement mechanism that includes a pivotable support holder and a pair of rollers which engage the periphery of the ring gear is designed so that the rollers, which do not distort the ring gear, push it into mesh first with one of the rotating burnishing gears, and then with the other burnishing gear of the pair. The rollers force the ring gear to move so the center axis of the ring gear, which is initially displaced from the center of the support table, is positioned to coincide with the center point of the support table. The ring gears are fed onto the support tables in an alternating manner by an oscillating shuttle arm which forces the ring gears onto the support tables. The operation of the support tables and the gear engagement mechanism are controlled by cam surfaces on a rotating cam which controls cam followers that are positioned on opposite sides of said cam and are maintained apart against the force of a third air cylinder spring.

30 Claims, 9 Drawing Figures

RING GEAR BURNISHING MACHINE

BACKGROUND OF THE INVENTION

It is highly desirable to minimize the average time that it takes for each gear to run through a gear burnishing machine to burnish the gear and to remove scale after heat treatment, but prior to gear inspection. However, the amount of burnishing action that must take place on each gear is determined by the nature of the gear and the required burnishing action is a predetermined factor. Therefore, in order to minimize the average burnishing time, it is necessary to provide a multiple gear burnishing system with an overlapping burnishing cycle so the loading and unloading times for the gears consumes only a minor portion of the entire burnishing cycle, and such loading and unloading occurs for one gear while another gear is being burnished. One solution to this problem is to provide an index drive for multiple gears, but an index drive machine is overly complicated and expensive. For example, a four-station index drive operating on a six-second cycle could provide twelve seconds of burnishing per gear, but this would require four sets of expendable burnishing gears.

In the gear burnishing system of the present invention, by contrast, a shuttle mechanism is employed instead of an index drive, wherein the first fed gear that is fed to the burnishing machine is pushed to one of two gear burnishing stations and the next gear is fed to the other station in an alternating manner. A rotating cam controls the vertical displacement of support tables for the ring gear workpieces and the gear engagement means which causes meshing of the burnishing gears at each station with their associated ring gear. This loading technique allows burnishing to continue on one gear while the other is being loaded or unloaded. In addition, only two sets of expendable gear burnishing machines are required for a two-station gear burnishing machine which is much less complicated and expensive than a four-station index drive machine with a comparable average gear burnishing time.

In the present invention, a brake/clutch mechanism may be employed to stop the rotation of the control cam so that a dwell time can be provided wherein both gears may be burnished for a period of time longer than it takes for the control cam to complete a complete revolution, thereby allowing the burnishing time for each ring gear workpiece to be adjustable by control of the dwell time of the brake/clutch arrangement.

A gear burnishing engagement mechanism, for the machine of the present invention, employs a pair of pressure rollers at each burnishing station, that are each approximately in line of the center line of one burnishing gear and the center line of the ring gear. The pressure distribution applied by the pressure rollers to the ring gears in this manner, thus minimizes distortion of the shape of the ring gear.

DESCRIPTION OF THE DRAWINGS

The present invention is described by reference to the drawings in which.

TECHNICAL DESCRIPTION OF THE INVENTION

Figure 1:
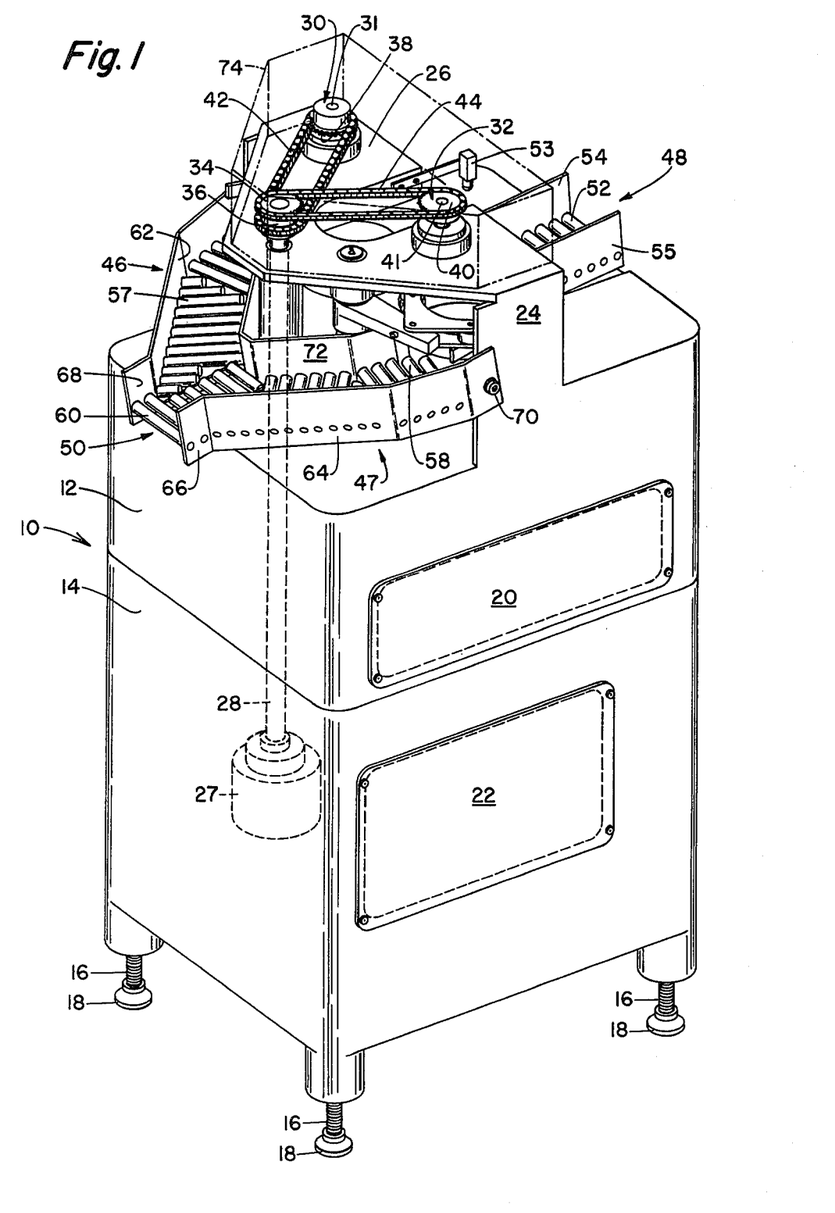
FIG. 1 is an overall perspective view of the gear burnishing machine of the present invention.

The burnishing machine of the present invention removes minor nicks and burrs from the active tooth area of ring gears, thereby reducing the number of rejects. An overall perspective view of the ring gear burnishing machine of the present invention is shown in FIG. 1 wherein the burnishing machine 10 is formed with a housing having an upper section 12 and a lower section 14. The machine is supported by adjustable levels 16 which carry the feet 18 that rest on the floor. The upper section 12 of the housing has a removable door plate 20 which may be removed for access into the housing, and the removable door plate 22 is also provider for the lower section 14.

An electrical motor and gear box 27 is contained in the lower section 14 of the housing and is coupled to drive the burnishing line shaft 28. The shaft 28 is used to supply power to a pair of burnishing gears at each of two burnishing stations which burnish the ring gear workpiece. It extends through the top plate 26 of the machine and carries the pair of sprockets 34, 36 which are aligned one above on the upper end of the shaft. A drive chain 42 is coupled to the lower sprocket 36 and another drive chain 44 is coupled to the upper sprocket 34.

The drive chain 42 engages a second sprocket 38 that is mounted on the shaft 31 of a spindle assembly 30. The drive chain 44 is connected to a sprocket 40 which is connected to the shaft 41 of a spindle assembly 32 that is inverted with respect to the spindle assembly 30 in order to make the associated sprocket level with the corresponding drive chain. A cover, such as the cover 74 which is shown in dotted lines, may be placed over the moving mechanism on the top of the gear burnishing machine, if desired, to prevent access to the moving drive train above the plate 26.

The upper section of the housing has a pair of upwardly extending braces 24, which are used to support the top plate 26. The gears are supplied into the input feed chute 48 over the rollers 52 which are supported at their ends by the parallel thin-wall metal sections 54, 55 to the two burnishing stations of the machine which are located on opposite sides of the machine below the spindle assemblies 30, 32. After leaving these burnishing stations, they travel over the rollers 57, 58 in the intermediate merging chutes 46, 47 to the rollers 60 in the output chute 50, which is defined by the short, parallel thin-wall sections 66, 68 which join the longer sections 62, 64 that are secured to the braces 24 by set screws 70. The rear wall of the merging chutes 46, 47 is formed by the thin-wall section 72.

Figure 2:
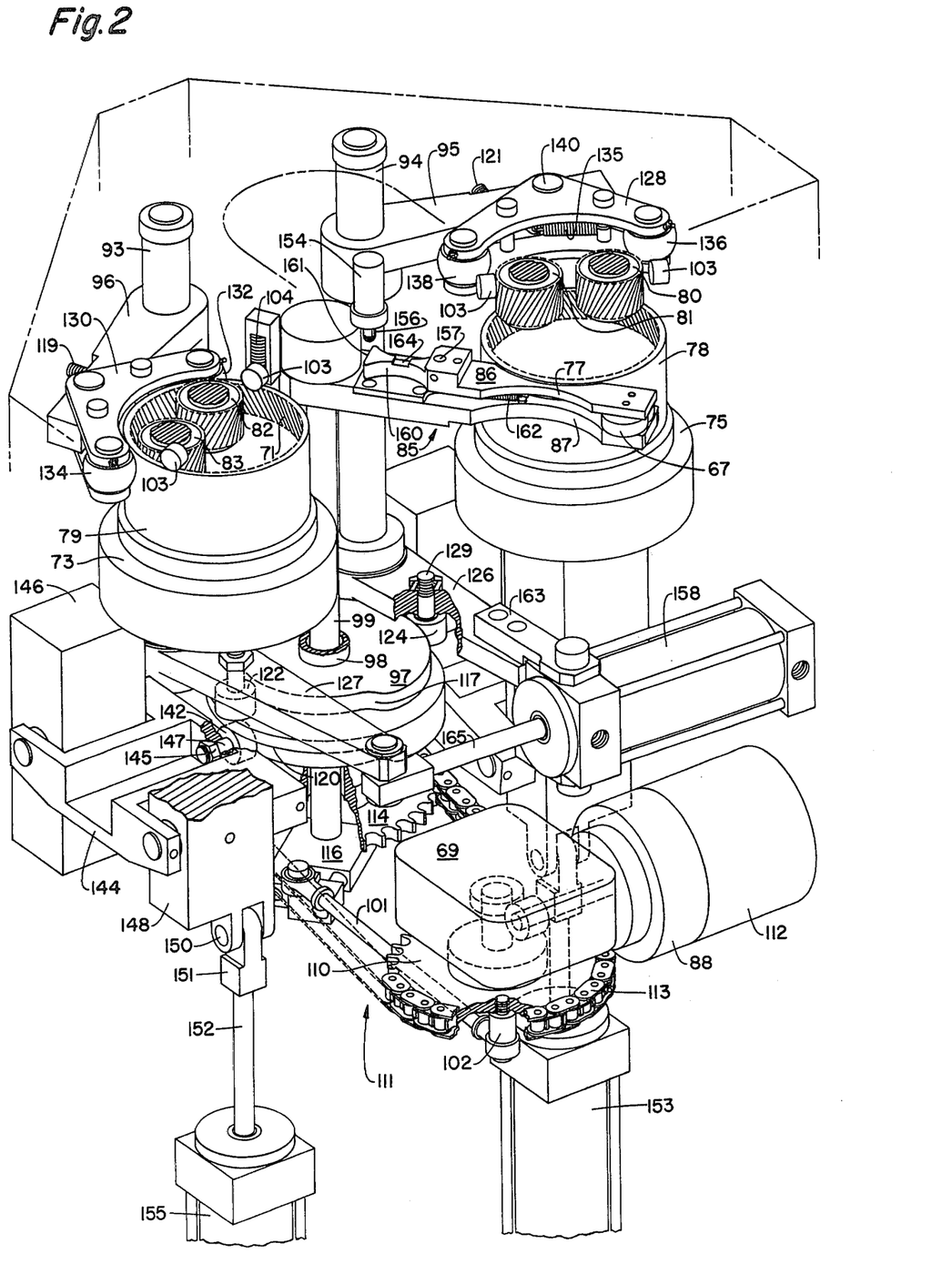
FIG. 2 is a perspective view of the inner mechanism of the machine of FIG. 1 with various components shown in partial section and with other components eliminated for clarity of presentation.

The operation of the gear burnishing machine of the present invention can be appreciated in more detail by reference to FIG. 2. The ring gears entering the input feed chute 48 are alternately fed to the left hand burnishing station under the burnishing gear spindle 30, and then to the right hand gear burnishing station under the burnishing gear spindle assembly 32, as viewed in FIG. 1. In FIG. 2, the gear burnishing station under the burnishing gear spindle assembly 32 is shown on the left hand side of the drawing, while the gear burnishing assembly station under the burnishing gear spindle assembly 30 is shown on the right hand side of the drawing. The driven shaft 31 is coupled to the burnishing gear 80 while the driven shaft 41 is coupled to the burnishing gear 82 so that the burnishing gears 80 and 82 are driven from the burnishing gear spindle assemblies 30, 32, respectively.

The burnishing gears 80 and 82, which are the driven burnishing gears, preferably have one less tooth than the gears 81 and 83 which are idler gears and rotate about undriven shafts (not shown). The driven gears 80, 82 are low operating pressure angle gears while the gears 81, 83 are high operating pressure angle gears. The use of this combination of gears provides an improved burnishing action in the manner described in copending application entitled "Gear Burnisher", Ser. No. 152,446, filed Apr. 22, 1980 in the name of Henry J. Flair and assigned to the assignee of the present invention, which application is merely incorporated by reference into the present document. Other combinations of burnishing gears may be utilized with the burnishing gear apparatus of the present invention, including burnishing gears having the same number of teeth and same operating pressure angle, however.

As the ring gear workpieces are fed into the machine through the input chute 48, they are alternately fed through the left or to the right, as viewed in FIG. 2, by the shuttle arm 85, which has a curved section 87 on each side of the arm that corresponds generally to the shape of the outer circumference of the ring gear workpieces. The shuttle arm 85 is coupled to the reciprocally oscillating shuttle rocker shaft 99 which causes the shuttle arm 85 to rock back and forth in unison with the rocker shaft. The shuttle arm 85, therefore, alternately pushes one ring gear, such as the ring gear 79, to the left where its teeth 71 engage the burnishing gears 82, 83, and the next ring gear, such as the ring gear 78, to the right where its teeth engages the burnishing gears 80, 81.

The drive for the shuttle rocker shaft 99 is obtained from a crank mechanism 111 attached to a rotating sprocket 110. The sprocket 110 is driven by the drive motor 112 through a conventional gear drive 69 and clutch/brake assembly 88. Control of the clutch and brake of this assembly is preferably provided by an external conventional control circuit in a gear checking machine that receives the ring gears after the gear burnisher has burnished them. The external control circuit thus can control the burnishing time allowed for each ring gear. It is not necessary that the circuit that is used to control the clutch and brake, however, be associated with any other piece of equipment.

The roller chain 113 is coupled to this sprocket and to a second sprocket 114. A rocker arm 101 is secured to a crank pin at 102 which is eccentric on the sprocket 110. The rocker arm 101 is coupled to the adjustable rocker arm assembly 116 so that the length of the rocker arm may be adjusted thereby controlling the oscillation angle of the shuttle arm 85. The rocker arm shaft 99 is secured at its lower end to the rocker arm assembly 116. Thus, as the sprocket 110 rotates, a rocking action will be imparted to the rocker arm shaft 99 by the assembly 116, thereby causing the shuttle arm 85 to rotate back and forth so that the incoming ring gear workpieces are alternately fed to the left-hand or to the right-hand gear burnishing station as viewed in FIG. 2. As a new ring gear is pushed into the burnishing station, the prior burnishing gear is forced off of the station and along either of the rollers 56 or the rollers 58.

During the loading, burnishing, and unloading of the ring gear workpieces into the burnishing apparatus of the present invention, timing and control of the burnishing operation is provided by the dual cam 97. The dual cam has a horizontal cam surface 117 and a vertical control surface 120. The horizontal cam surface 117 is engaged by a pair of cam followers 122, 124. The cam followers 122, 124 are respectively secured to the pivot arms 126, 127 by the threaded shafts such as the shaft 129. The pivot arm 126, in turn, is secured at its rear to the pivot shaft 93, while the pivot arm 127 is secured to the pivot shaft 94. The pivot shafts 93, 94 are connected to the pressure arms 95, 96 to the roller support assemblies 128, 130. Each of the roller support assemblies 128, 130 carry a pair of rollers 132, 134 and 136, 138 which are forced into engagement with the outer surfaces of the workpieces 78, 79 in accordance with the timing provided by the cam surface 117 which engages the cam followers 122, 124.

Figure 6:
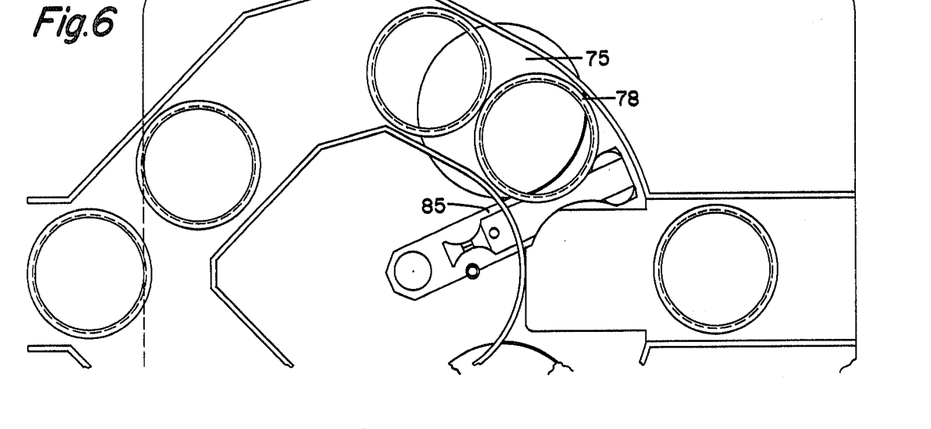
FIG. 6 is a partial top view of one burnishing station which shows a new ring gear forcing a burnished ring gear out of the burnishing station.
Figure 7:
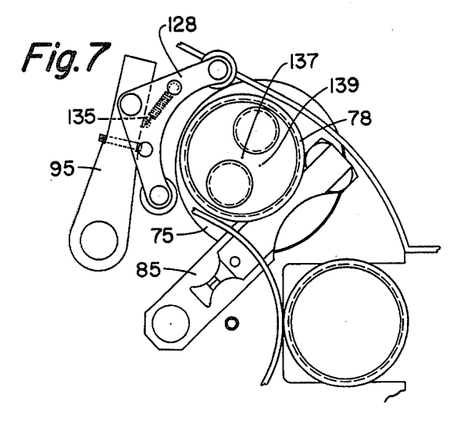
FIG. 7 is a partial top view of one burnishing station which shows the new ring gear being forced by the shuttle arm so that its center axis does not coincide with the center of the support table.

The ring gear workpieces 78, 79 are fed onto the support tables 73, 75, when the turn tables are in a retracted or lowered position. The right-hand support table 75 is in its loading position while the left-hand support table 73 is in its burnishing position in FIG. 2. As the gear has been loaded on the support table 75, it forces the previous gear off of the support table and onto either the rollers 56 or 58, as shown in FIG. 6. The new gear is now positioned by the shuttle arm 85 such that the center axis 137 of the ring gear 78 is not in perfect alignment with the center point 139 of the circular support table 75, but rather is displaced from it as shown in FIG. 7.

When the support table 75 is subsequently raised to its burnishing position, the rollers 136, 138 will contact the outer surface of the ring gear 78 so as to force the ring gear 78 into contact with the outside burnishing gear of the related pair of burnishing gears, which in this case is the gear 80. The ring gear 78 is then rotated slightly by the rollers so that the inside burnishing gear, which in this case is the gear 81, is brought into mesh with the internal teeth of the ring gear. By providing the engagement of the outside burnishing gear with the ring gear teeth prior to the engagement of the inside burnishing gear, the damage by nicking of gears due to misalignment is minimized.

Figure 8:
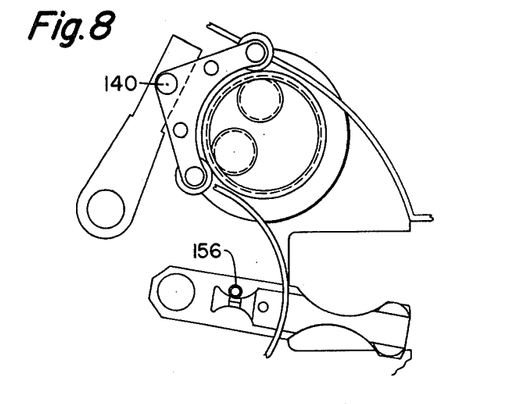
FIG. 8 is a partial top view of one burnishing station which shows the pressure rollers forcing the new ring gear so its center axis coincides with the center of the support table upon mesh of the burnishing gears and the ring gear.

The roller support assembly 128 is spring loaded by the coil spring 135, one end of which is secured to the roller support assembly and the other end of which is secured to the pressure arm 95 so that the roller support assembly 128 is free to pivot about the pivot point 140 to provide the required positioning force on the ring gear workpiece as it is brought to its burnishing position. When burnishing occurs, the center axis 137 of the ring gear will be in substantial alignment with the center 139 of the support table 75, as shown in FIG. 8.

The loading of ring gears into the burnishing machine, in the described manner, enables the pressure rollers 132, 134, 136 and 138 to be in alignment with the center line of the burnishing gear and the center line of the ring gear. This feature is very desirable since the ring gear workpieces are generally very thin and easily distorted, and avoidance of distortion of the ring gears is particularly desirable with this type of burnishing machine.

The raising and lowering of the support tables 73, 75 is under control of the cam follower 142, and a similar one on the other side of the cam which is not shown, which are in contact with the cam surface 120. The cam follower 142 is secured to a rotational bracket 144 by the nut 145 on the threaded shaft 147. The bracket 144 is secured to a portion of the housing 146 so that it may pivot with respect thereto. The bracket 144 is also connected to a coupling block 148 which is connected by a clevis pin 150 to a coupling element 151 on the end of the shaft 152 of the air cylinder spring 155.

The air cylinder spring 155 acts to control the motion of the support table 73. As the cam follower 142 follows the cam surface 120 and the cam surface 120 rises vertically, the coupling block 148 is vertically displaced and support table 73 thus rises to the burnishing position. In a similar manner, when the cam follower 142 drops vertically on the cam surface 120, the support table 73 will be retracted downwardly, against the force of the air cylinder spring 154 to the loading position. A similar air cylinder 153 is connected and coupled to raise and lower the support table 75.

A third air cylinder spring 158 is coupled so that the body of the air cylinder spring 158 is connected through the link 163 to the pivot arm 91 that is coupled to shaft 94 that is controlled by the cam follower 124. The end of the shaft 165 for the air cylinder 158 is connected to the pivot arm 127 which is coupled to the shaft 93 which is controlled by the cam follower 122. The air cylinder 158, therefore, provides a spring that acts on the cam followers 122, 124 as they follow the cam surface 117 to control the rocking back and forth of the pivot shafts 93 and 94. All of the individual air cylinders are preferably interconnected to act as accumulators for each other. During operation, no air is used or exhausted, but a uniformed pressure range is maintained on all three air cylinder springs.

A pair of ring gear stripper rollers 103 are employed for at each burnishing station so that they contact the upper surface of each ring gear. The ring gear stripper rollers are all forced downwardly by a spring such as the spring 104. The purpose of these rollers is to keep the ring gear firmly against the support table as the support table is lowered, thereby keeping the ring gear square with the support table until it is clear of the burnishing gears which prevents the ring gear from locking on the burnishing gears.

The cam 97 is secured to a hollow, relatively large diameter shaft 98. The lower end of which is secured to the sprocket 114 so that as the sprocket rotates the cam shaft 98 and the cam 97 rotate with it. The rocker arm shaft 99 passes through the hollow interior of the cam shaft 98 and the cam 97 down to the adjustable rocker arm assembly 116 so that the shaft 99 may oscillate in conjunction with the rotation of the sprocket 110.

The clutch/brake assembly 88 that is associated with the drive of the sprocket 110 is controllable by external circuitry (not shown) in a conventional manner. This allows for overlapping of the burnishing of both of the workpiece gears 78, 79 so that they both may be burnished simultaneously for a predetermined period of time and then one of the gears may be unloaded, while the burnishing of the other gear continues during the unloading of the other gear. In this manner, the alternate loading and unloading of one burnishing lstation, while the other burnishing station is finishing its burnishing, minimizes the overall burnishing time for the two gears.

Figure 3:
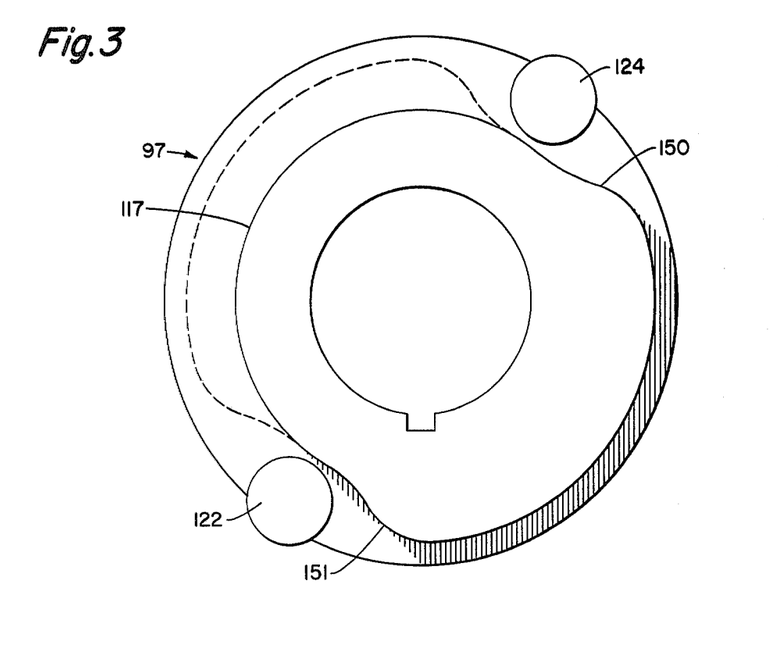
FIG. 3 is a top view of the control cam of the present invention.

FIG. 3 shows a top view of the cam 97 and the cam followers 122, 124 with the cam 97 in this instance rotating in a counterclockwise direction. When the cam followers 122, 124 are at the position shown in FIG. 3, the brake of the brake/clutch 88 may be employed to stop rotation of the sprocket 110 and thus to maintain the cam followers 122, 124 at this stop position for a predetermined period of time. Following this time, the clutch of the brake/clutch allows the sprocket 110 to again rotate; and thus, as the cam 97 rotates, the cam followers 124 will be forced outwardly from the center of the cam by the cam ramp 150 which causes disengagement of the pressure rollers 136, 138 from the outer surface of the ring gear 78. The pressure rollers 132, 134, however, continue in contact with the outer surface of the ring gear 79 because the cam follower 122 is still at its same relative location, relative to the center of the cam. A second stop position for the cam 97 is shown by the dotted lines, which is 180° from the solid line position shown in FIG. 3. When the cam ramp 151 is reached by the cam follower 124, the pressure rollers 136, 138 are brought into contact with the outer surface of a new workpiece in the position of the ring gear 78 since the cam follower 124 is again brought in closer to the center of the cam 97. The operation of the pressure rollers 132, 134 are dependent on the cam follower 122 in a similar manner. Adjustable stops 119, 121 are also provided for controlling the degree of swing of the roller support assemblies during operation.

Figure 4:
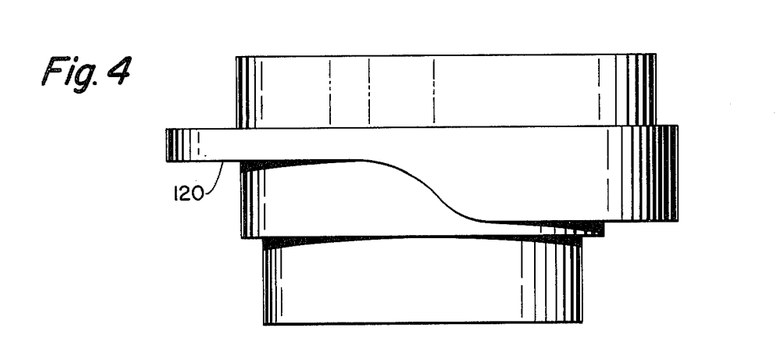
FIG. 4 is a side view of the timing control cam of the present invention.
Figure 5:
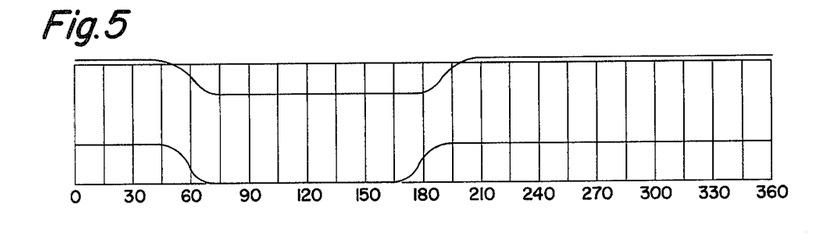
FIG. 5 is a cam diagram which represents the movements of the control cam followers.

FIG. 4 shows a profile of the cam surface 120 which is used to raise and lower the support table 73, 75. The cam followers 142 that control this motion are displaced 180° across the diameter of the cam 97 and thus they alternately will raise and lower the support tables as the cam 97 rotates. This timing chart showing the relative angular displacement of the cam surfaces for the pressure arm cam surface 117 and the support table cam surface 120 is shown in FIG. 5, wherein the top chart is for the pressure arm cam surface and the bottom chart is for the support table cam surface. This chart indicates only the relative timing of the cam 97 during actual rotation of the cam shaft 98; and thus, the dwell time provided by the clutch/brake 88 is not incorporated into this timing chart. However the cam must stay within the angle indicated to assure that both cam followers will not be on ramps 150 and 151 when stopped, which in the illustrated embodiment is between 210° and 219°.

If the input supply of ring gear workpieces is interrupted and no more gears are fed into the machine, the burnishing stations become empty. Since the forcing of a previously burnished gear out of the burnishing station is accomplished by the incoming gears, as shown in FIG. 6, some means is desirably provided to remove the last gear burnished from a burnishing station when no more ring gear workpieces are being supplied. This is accomplished in the present invention by means of the discharge arm 86 which has a pair of side-by-side circular bumpers 67 secured to the end of the discharge arm 86. The discharge arm 86 has a pair of curved sections 77 similar to the curved section 87 on the shuttle arm 85. An optical sensor 153 is employed to determine when a ring gear is not present in either of the burnishing stations.

Figure 9:
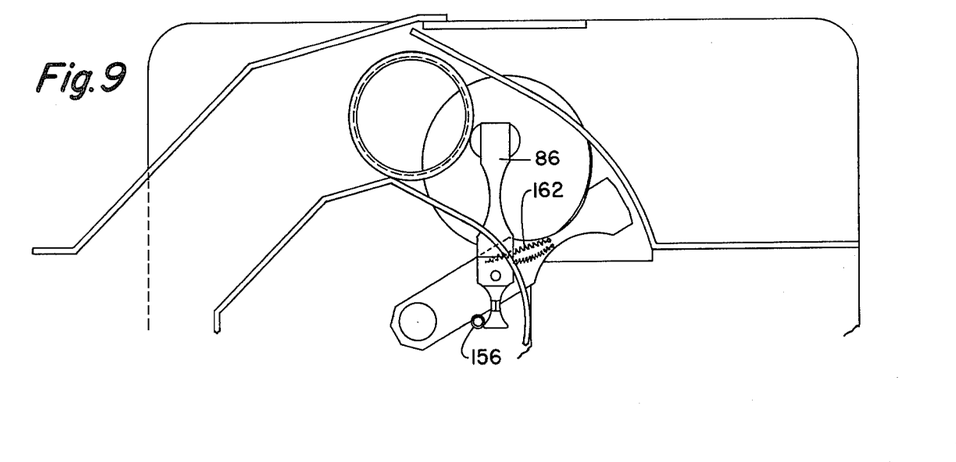
FIG. 9 is a partial top view of one burnishing station which shows the action of the discharge arm in forcing out the last gear in the station when the input supply of gears is interrupted.

As shown in FIG. 9, the absence of a ring gear in a burnishing station operates a solenoid 154 which causes a pin 156 to be moved downwardly towards the top surface of the shuttle arm 85. The discharge arm 86 is pivoted about the pivot point 157 and has a pair of relatively short cam sections 160 which contact one side of the pin 156 when the solenoid 154 is actuated. A coiled return spring 162 has one of its ends connected to the moveable discharge arm and the other end connected to the fixed shuttle arm 85. As the shuttle arm 85 moves, the pivot point of the discharge arm 86 is set so that it causes the longer front portion of the discharge arm 86 to extend angularly beyond the shuttle arm. The difference in angular extension between the discharge arm 86 and the shuttle arm 85 continues and the ring gear is pushed out of the burnishing station until the pin 156 glides over and beyond the end 161 of the cam section 160, at which point the return spring 162 pushes the discharge arm back toward its initial position, as shown in FIG. 8. The last ring gear at the burnishing station is thus forced out of the burnishing station and onto the output chute rollers 56 or 58.

Since the pin 156 may engage either the left-hand or the right-hand cam section 160 of the discharge arm 86, the discharge arm cam operates to discharge the last ring gear that has been burnished in either station. The cut-out 164 on top of the cam section 160 is employed to allow the pin 156 to slide to one side or the other in the event that it came down directly on top of this part of the cam section 160 during actuation. As the discharge arm 86 swings back and forth, the pin 156, when the solenoid 154 is actuated, will alternately hit one side or the other of the cam section 160, thereby causing the discharge arm 86 to spring either to the left or to the right as long as operation is continued. Upon shutting down of the machine, the solenoid 154 is deactivated and the pin 156 is retracted.

What is claimed is:

1. A ring gear burnishing machine comprising first and second burnishing stations at which first and second ring gear workpieces are respectively burnished in an overlapping cycle wherein said burnishing stations each comprise a vertically displaceable support table, burnishing gear means, and burnishing gear engagement means and said machine further comprises a first rotatable cam surface, first cam follower means engaging said first cam surface, support table control means coupled to said first cam follower means for raising and lowering said support tables so that ring gear workpieces on said tables are raised to a burnishing position or lowered to loading position at different times under control of said first cam surface, a second rotatable cam surface, second cam follower means engaging said second cam surface, burnishing gear engagement control means coupled to said second cam follower means, for controlling said burnishing gear engagement means so that the ring gear workpieces at each burnishing station are engaged by and disengaged from said burnishing gear means at different times in an alternating fashion, drive means for rotating said first and second cam surfaces, dwell means for interpreting said drive means for a predetermined period of time during which said burnishing gear means at each station are both in engagement with a ring gear workpiece and rotation means for causing rotation of both of said burnishing gear means relative to said ring gear workpieces on said support tables.

2. A ring gear burnishing machine as claimed in claim 1 wherein said burnishing gear means each comprise a pair of burnishing gears one of which is a driven gear and the other of which is an idler gear.

3. A ring gear burnishing machine as claimed in claim 2 wherein said burnishing gear engagement means enables one gear of each pair of burnishing gears to be brought into contact with its associated ring gear workpiece prior to contact of the other burnishing gear of the pair with the ring gear workpiece.

4. A ring gear burnishing machine as claimed in claim 1 wherein said dwell means comprises a brake and clutch means that is coupled to said drive means.

5. A ring gear burnishing machine as claimed in claim 1 comprising a plurality of spring-loaded pressure rollers at each burnishing station positioned to engage the upper surface of said ring gear so as to force it down from said burnishing gear means for disengagement of said burnishing gear means and its associated ring gear workpiece when its associated support table is lowered from its burnishing position toward its loading position.

6. A ring gear burnishing machine as claimed in claim 1 wherein said first and second cam follower means each comprise a pair of cam followers with one cam follower from each pair being associated with only one of said burnishing stations and with each cam follower of each pair of cam followers being separated from the other cam follower of said pair under the force of an air cylinder spring means.

7. A ring gear burnishing machine as claimed in claim 4 wherein said burnishing gear means each comprise a pair of burnishing gears one of which is a driven gear and the other of which is an idler gear.

8. A ring gear burnishing machine as claimed in claim 7 wherein said burnishing gear engagement means enables one gear of each pair of burnishing gears to be brought into contact with its associated ring gear workpiece prior to contact of the other burnishing gear of the pair with the ring gear workpiece.

9. A ring gear burnishing machine as claimed in claim 8 comprising a plurality of spring-loaded pressure rollers at each burnishing station positioned to engage the upper surface of said ring gear workpiece so as to force it down from said burnishing gear means for disengagement of said burnishing gear means and its associated ring gear workpiece when said support table is lowered from its burnishing position toward its loading position.

10. A ring gear burnishing machine as claimed in claim 9 wherein said second cam follower means comprises a pair of cam followers with one cam follower from each pair being associated with only one of said burnishing stations and with each cam follower of said pair of cam followers being maintained apart from each other on said second cam surface by an air cylinder spring means and said support table control means each comprise an air cylinder spring means coupled to said support tables.

11. A ring gear burnishing machine comprising first and second burnishing stations, each of which comprise gear burnishing means, at which stations a different ring gear workpiece is burnished, a shuttle arm between said burnishing stations, input supply means for feeding a train of ring gear workpieces into said machine between said burnishing stations where they can be engaged by said shuttle arm, a shuttle shaft coupled to said shuttle arm shaft reciprocating means for reciprocating said shaft back and forth in an oscillatory manner to reciprocate said shuttle arm so that it pushes a first fed ring gear workpiece toward one burnishing station and the next fed ring gear workpiece toward the other burnishing station, ring gear sensing means for sensing when the supply of ring gear workpieces being fed to the machine is interrupted and discharge means comprising a displaceable discharge arm that is under the control of said ring gear sensing means and is angularly displaced in both directions beyond said shuttle arm when said sensing means indicates the supply of ring gear workpieces to the machine has been interrupted so that said discharge arm forces the last gear burnished in said interrupted train of ring gear workpieces out of its burnishing station regardless of whether the last gear burnished is in the first or the second burnishing station.

12. A ring gear burnishing machine as claimed in claim 11 wherein said discharge means comprises a solenoid mounted above said shuttle arm which is controlled by said ring gear sensing means, said solenoid having a pin associated therewith which is lowered toward said shuttle arm when the feed of ring gears to said machine is interrupted, and said discharge arm is pivotally mounted about a pivot point on top of said shuttle arm and has a relatively long ring gear pusher section and a relatively short cam section on opposite sides of said pivot point, said cam section having two curved cam side surfaces of substantial identical shape and a rear clearance surface which allows said pin to transfer from one cam side surface to the other when a predetermined magnitude of angular rotation of said discharge arm about said pivot point relative to said shuttle arm is achieved and resilient means coupled between said shuttle arm and said discharge arm.

13. A ring gear burnishing machine as claimed in claim 12 wherein said shuttle and discharge arms each have two side surfaces that are shaped to substantially conform to the periphery of the ring gear workpiece.

14. A ring gear burnishing machine as claimed in claim 11 wherein said shuttle arm initially places said ring gear workpieces on said support tables with the center axis of said ring gear workpiece displaced from the point on said table which will substantially coincide with said center axis during burnishing and each station of said machine further comprises gear engagement means for repositioning the associated ring gear workpiece so that said center axis of said ring gear workpiece and said point substantially coincide and said gear burnishing means engages said ring gear workpiece upon raising of the associated support table to its burnishing position.

15. A ring gear burnishing machine as claimed in claim 14 wherein said discharge means comprises a solenoid mounted above said shuttle arm which is controlled by said ring gear sensing means, said solenoid having a pin associated therewith which is lowered toward said shuttle arm when the feed of ring gears to said machine is interrupted and said discharge arm is pivotally mounted about a pivot point on top of said shuttle arm and has a relatively long ring gear pusher section and a relatively short cam section on opposite sides of said pivot point, said cam section having two curved cam side surfaces of substantial identical shape and a rear clearance surface which allows said pin to transfer from one cam side surface to the other when a predetermined magnitude of angular rotation of said discharge arm about said pivot point relative to said shuttle arm is achieved and resilient means coupled between said shuttle arm and said discharge arm.

16. A ring gear burnishing machine as claimed in claim 15 wherein said shuttle and discharge arms each have two side surfaces that are shaped to substantially conform to the periphery of the ring gear workpiece.

17. A ring gear burnishing machine as claimed in claim 14 wherein said gear burnishing means each comprise a pair of burnishing gears one of which is a driven gear and the other of which is an idler gear and said gear engagement means repositions the associated ring gear workpiece so that one gear of each pair of burnishing gears is brought into contact with its associated ring gear workpiece prior to contact of the other burnishing gear of the pair with the ring gear workpiece.

18. A ring gear burnishing machine as claimed in claim 17 wherein said discharge means comprises a solenoid mounted above said shuttle arm which is controlled by said ring gear sensing means, said solenoid having a pin associated therewith which is lowered toward said shuttle arm when the feed of ring gears to said machine is interrupted and said discharge arm is pivotally mounted about a pivot point on top of said shuttle arm and has a relatively long ring gear pusher section and a relatively short cam section on opposite sides of said pivot point, said cam section having two curved cam side surfaces of substantial identical shape and a rear clearance surface which allows said pin to transfer from one cam side surface to the other when a predetermined magnitude of angular rotation of said discharge arm about said pivot point relative to said shuttle arm is achieved and resilient means coupled between said shuttle arm and said discharge arm.

19. A ring gear burnishing machine as claimed in claim 18 wherein said shuttle and discharge arms each have two side surfaces that are shaped to substantially conform to the periphery of the ring gear workpiece.

20. A ring gear burnishing machine as claimed in claim 11 comprising a plurality of spring-loaded pressure rollers at each burnishing station positioned to engage the upper surface of said ring gear workpiece so as to force it down from said burnishing gear means for disengagement of said burnishing gear means and its associated ring gear workpiece following burnishing.

21. A ring gear burnishing machine comprising first and second burnishing stations at which first and second ring gear workpieces are respectively burnished wherein said burnishing stations each comprise a vertically displaceable support table having a lowered loading position and a raised burnishing position, a pair of burnishing gears, one of which is a driven gear and the other of which is an idler gear, and burnishing gear engagement means which enables one gear of each pair of burnishing gears to be brought into contact with its associated ring gear workpiece prior to contact of the other burnishing gear of the pair with the ring gear workpiece, input feed means for alternately feeding ring gear workpieces to said first and second stations so that said ring gear workpieces are initially placed on said support tables with the center axis of said ring gear workpiece displaced from the point on said table which will substantially coincide with said center axis during burnishing, said burnishing gear engagement means being arranged to reposition associated ring gear workpiece so that said ring gear workpiece and said point substantially coincide and said gear burnishing means engages said ring gear workpiece upon raising said associated support table to said raised burnishing position, and rotation means for causing rotation of both of said pairs of said burnishing gears.

22. A ring gear burnishing machine as claimed in claim 21 comprising a plurality of spring-loaded pressure rollers at each burnishing station positioned to engage the upper surface of said ring gear workpiece so as to force it down from said burnishing gear means for disengagement of said burnishing gear means and its associated ring gear workpiece when said support table is lowered from its burnishing position toward its loading position.

23. A ring gear burnishing machine as claimed in claim 21 wherein said input feed means comprises a shuttle arm between said burnishing stations, input supply means for feeding a train of ring gear workpieces into said machine between said burnishing stations where they can be engaged by said shuttle arm, a shuttle shaft coupled to said shuttle arm and shaft reciprocating for reciprocating said shaft back and forth in an oscillatory manner to reciprocate said shuttle arm so that it pushes a first fed ring gear workpiece toward one burnishing station and the next fed ring gear workpiece toward the other burnishing station.

24. A ring gear burnishing machine as claimed in claim 21 wherein said machine comprises a cam having a support table control cam surface for controlling the position of said support tables, a support table cam follower means coupled to said support tables comprising support table cam followers for each support table which are in engagement with said support table control cam surface, support table control means coupled to said support table cam follower means for positioning said support tables and drive means for driving said cam.

25. A ring gear burnishing machine as claimed in claim 21 wherein said gear engagement means at each burnishing station comprises a reciprocating pressure arm means, a support holder pivotally mounted on said reciprocating pressure arm means, resilient means coupled between said reciprocating means and said support holder, a pair of pressure rollers coupled to said support holder which contact a side surface of said ring gear so as to achieve said repositioning of said ring gear workpiece under control of the motion of said support holder when said support table is raised to its burnishing position.

26. A ring gear burnishing machine as claimed in claim 25 wherein said machine comprises a cam having a pressure arm control cam surface for controlling the reciprocation of said pressure arm means, a pair of pressure arm cam follower means, each coupled to one of said pressure arms comprising the pressure arm cam followers in engagement with said pressure arm control cam surface, burnishing gear engagement control means coupled to said pressure arm cam follower means for controlling said burnishing gear engagement means and drive means for driving said cam.

27. A ring gear burnishing machine as claimed in claim 26 wherein said cam also comprises a cam having a support table control cam surface for controlling the position of said support tables, a support table cam follower means coupled to said support tables comprising support table control cam followers for each support table which are in engagement with said support table control cam surface, support table control means coupled to said support table cam follower means for positioning said support tables and drive means for driving said cam.

28. A ring gear burnishing machine as claimed in claim 27 wherein said pressure arm cam followers are maintained apart on said pressure arm control cam surface by an air cylinder spring means and said support table control means each comprise an air cylinder spring means coupled to said support tables.

29. A ring gear burnishing machine as claimed in claim 28 wherein said input feed means comprises a shuttle arm between said burnishing stations, input supply means for feeding a train of ring gear workpieces into said machine between said burnishing stations where they can be engaged by said shuttle arm, a shuttle shaft coupled to said shuttle arm and shaft reciprocating for reciprocating said shaft back and forth in an oscillatory manner to reciprocate said shuttle arm so that it pushes a first fed ring gear workpiece toward one burnishing station and the next fed ring gear workpiece toward the other burnishing station.

30. A ring gear burnishing machine as claimed in claim 29 comprising a plurality of spring-loaded pressure rollers at each burnishing station positioned to engage the upper surface of said ring gear workpiece so as to force it down from said burnishing gear means for disengagement of said burnishing gear means and its associated ring gear workpiece when said support table is lowered from the burnishing position toward its loading position.

* * * * *